Aug. 20, 1968 W. H. O'CONNELL 3,398,397
SIGNAL DEVICE FOR WORN TIRE TREADS
Filed Feb. 25, 1966 3 Sheets-Sheet 1
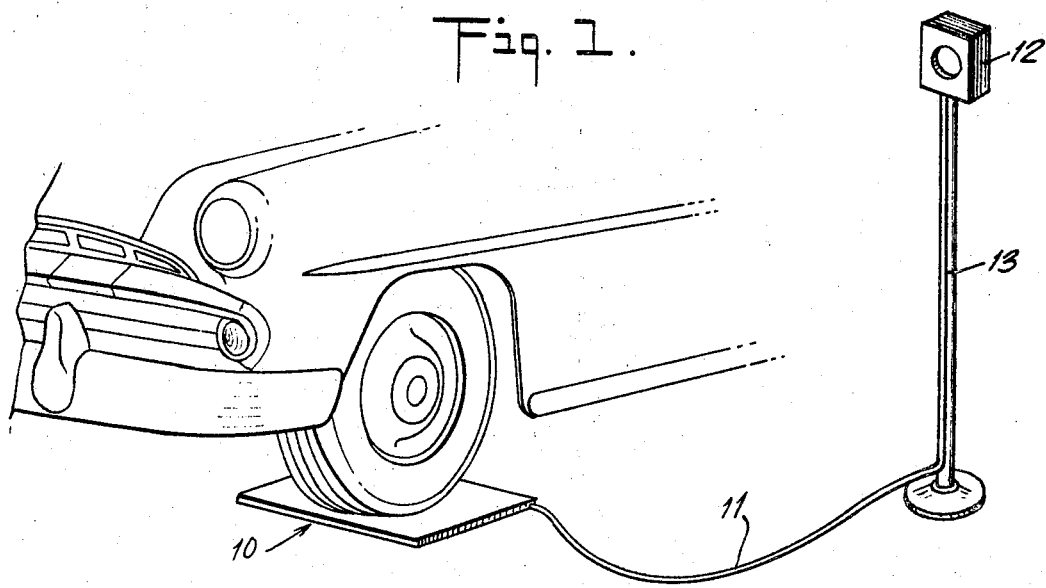
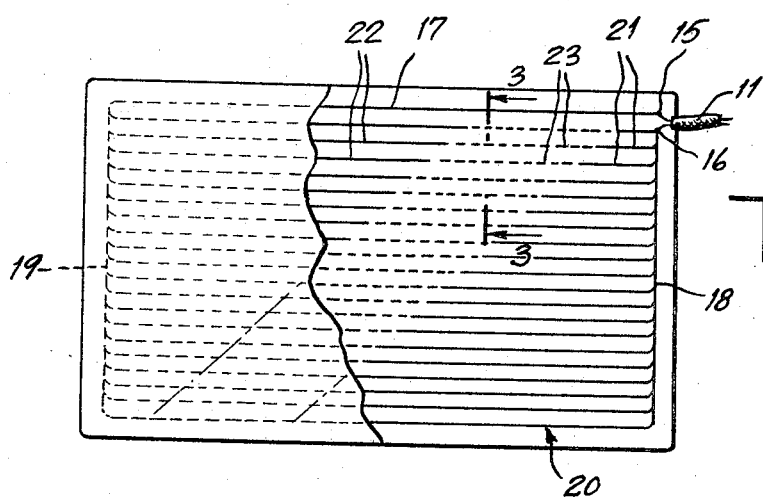
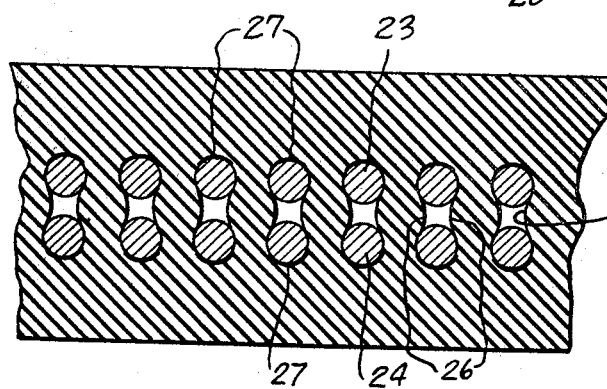
INVENTOR.
WILLIAM H. O'CONNELL
BY
ATTORNEYS

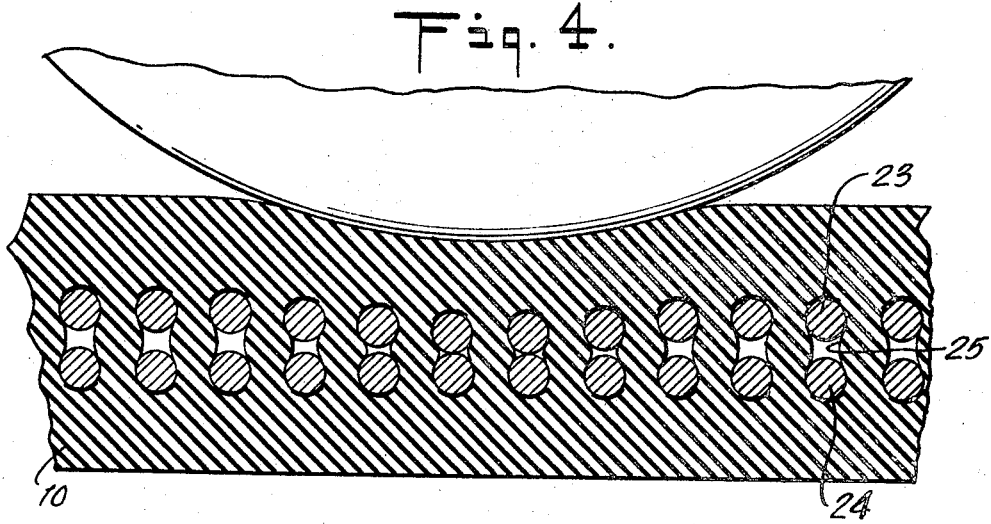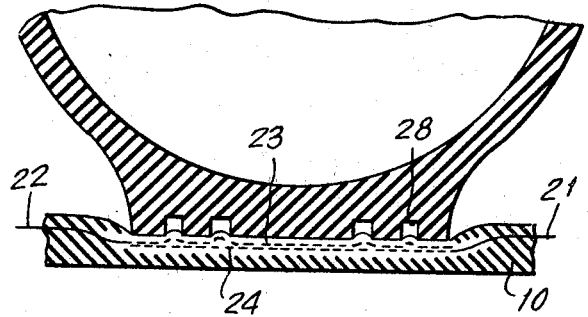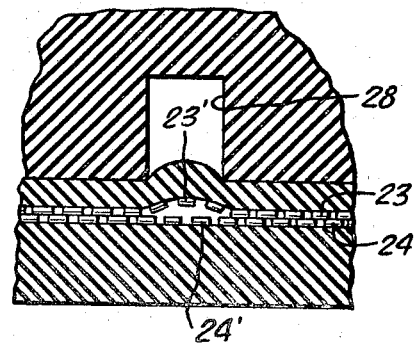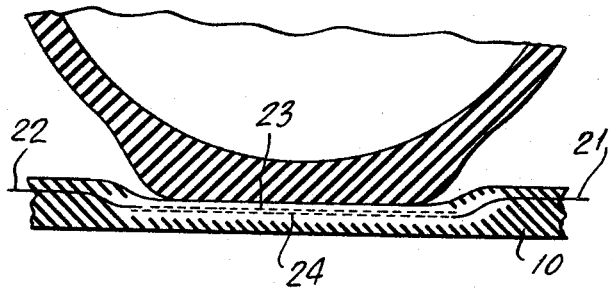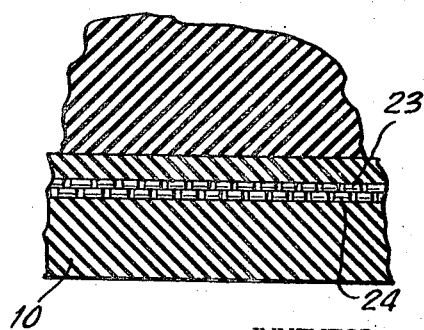

Aug. 20, 1968 W. H. O'CONNELL 3,398,397
SIGNAL DEVICE FOR WORN TIRE TREADS
Filed Feb. 25, 1966 3 Sheets-Sheet 3

INVENTOR
WILLIAM H. O'CONNELL
BY
Corey, Hart & Stemple
ATTORNEYS 3,398,397
SIGNAL DEVICE FOR WORN TIRE TREADS
William H. O'Connell, 1 Danny Lane,
Chappaqua, N.Y. 10514
Continuation-in-part of application Ser. No. 266,841,
Mar. 21, 1963. This application Feb. 25, 1966, Ser.
No. 534,280
12 Claims. (Cl. 340—52)

This application is a continuation-in-part of an application Ser. No. 266,841 filed Mar. 21, 1963, and now abandoned.

This invention relates to a device for detecting the condition of tire treads, and more particularly to a device which will automatically give a signal when a tire being examined thereby has little or no tread.

The gasoline service station provides one of the best outlets for the sale of tires, but its potentialities are not fully exploited principally because most attendants either are usually too busy taking care of their stations or are not sufficiently interested in selling replacement tires, especially if they are not the proprietors of the stations. The fact that tires as presently constructed need little attention for long periods also tends to make the ordinary attendant pay less attention to the conditions of the tires on the cars he services.

The purpose of the present invention is to provide a reliable device which will automatically check the treads on a car pulling up to a gasoline pump, and if the tread on any tire is so worn that the tire should be replaced, either immediately or in the near future, to give automatically an audible or visible signal capable of directing the attendant's attention to the fact.

Other object of the invention, as well as the novel features of construction and advantages thereof, will appear from the following description, when read in connection with the accompanying drawings, in which:

FIG. 1 is a perspective view showing how the device of the invention may be used;

FIG. 2 is a top plan view, partly in section, of a type of mat that may be employed for checking a tire tread;

FIG. 3 is a sectional view taken along the line 3—3 of FIG. 2 and showing on an enlarged scale a transverse vertical section of a portion of the mat;

FIG. 4 is a view similar to FIG. 3 showing what occurs in such mat portion when a car wheel passes over the same;

FIG. 5 is a longitudinal sectional view of a portion of the mat showing how it is affected by a tire with a good tread;

FIG. 6 is a view similar to FIG. 5 but showing in more detail the affect a good tread has on the mat;

FIG. 7 is a view similar to FIG. 5 and showing how the mat is affected by a tire with no tread;

FIG. 8 is a view similar to FIG. 7, but showing a smaller portion of the mat on an enlarged scale;

Figure 9:
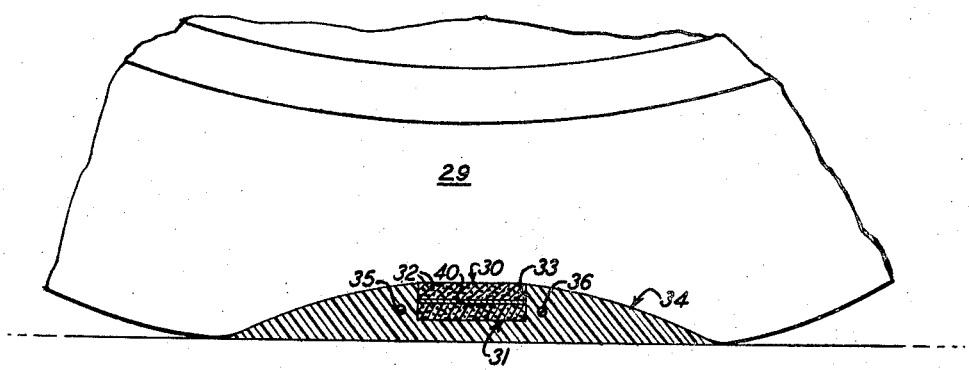
FIGS. 9, 10 and 11 are views similar to FIGS. 4, 6 and 8, respectively, of a modified form of the invention.

In FIG. 1 of the drawings, the reference numeral 10 designates generally a mat embodying the invention and placed on the driveway of a service station adjacent to a gasoline pump so that as a car approaches the latter the two wheels on one side of the car will necessarily pass over the mat before the car stops in proper relation to the pump for receiving gasoline. A second mat 10 may be so positioned on the driveway that the two wheels on the other side of the car will necessarily pass over the same before the car comes to a stop alongside the pump. It is within the contemplation of the invention to place across the driveway one mat of a length greater than the width of the car and constructed so that like two or more separate mats it will indicate by separate signals the conditions first of the two front tires and then of the two rear tires.

Associated with the mat 10 is an electric cable 11 which connects the mat to a signalling device 12 mounted on a standard 13. The signaling device 12 may comprise a signal light of known construction, or may comprise a sound device of known construction such as a horn or a loudspeaker associated with a sound record, or such signaling device may be capable of providing both light and sound as is well known to the art. The signalling device may be mounted anywhere within the confines of the station, as for example, on the gasoline pump itself where the attendant would notice it when he picked up the gasoline pump hose. If desired, the signal device could be made as an interlock on the latch that supports the gasoline pump hose at rest. This interlock may be so constructed that the attendant could not remove the hose or deliver gasoline until he had moved a button or lever which would release the hose and reset the interlock mechanism. It is also within the contemplation of the invention to utilize the signal device to trigger an audible and/or visual tire selling display; to release a printed sales message from a container on the pump island; or to actuate any other device which will assist in selling one or more tires to the owner of the car.

The end of the cable 11 associated with the mat 10, is connected to two terminals 15 and 16 of a wiring circuit embedded in the mat which is of substantial thickness. The mat is constituted of any suitable nonconducting, flexible and resilient material or materials, such as rubber or plastics, to enable the circuit to operate properly and to render is unnecessary that the wires of the circuit be covered. As is shown more clearly in FIG. 2 of the drawings, the circuit is composed of a longitudinal wire 17 connected at one end to terminal 15 and extending along one longitudinal edge portion of the mat, a transverse wire 18 connected at one end to the terminal 16 and extending along one end edge portion of the mat, and a transverse wire 19 connected at one end to the other end of wire 17 and extending along the other end edge portion of the mat. It is understood that wires 17, 18 and 19 are continuous throughout their lengths.

Connected at their ends to wires 18 and 19 are a series of spaced wires 20 extending across the mat to the other longitudinal edge portion thereof and each of which extends longitudinally of the mat in substantial parallelism to wire 17. Each wire in the series 20 thereof is composed of two continuous end portions 21, 22, each of which is constituted of a single, solid wire. Intermediate the two portions 21, 22 is a wire portion composed of two spaced associated lengths 23, 24 of broken wire (compare FIGS. 2 and 3). Each of the lengths 23, 24 is composed of a series of longitudinally spaced sections of wire filament arranged in alternate relation with the series of longitudinally spaced sections of wire filament constituting the other length so that when the two lengths are pressed together the sections of one length will bridge the spaces between the sections of the other length and form a continuous circuit for conducting electricity (note FIGS. 6 to 8). The two wire lengths 23, 24 are contained in a closed, longitudinally extending, elongated chamber 25 of greater depth than the combined vertical dimensions of such wire lengths and of a width less than the horizontal dimension of one of such lengths. As shown in FIG. 3, the wire lengths are located in vertically spaced relation in the upper and lower ends of chamber 25 and because of the reduced width of such chamber will be held in clamped relation at such chamber ends by the inherent resiliency of the mat material and will tend to be held in spaced relation by such resiliency and by the mat material which bulges into such chamber between the wire lengths. It is within the contemplation of the invention to more securely maintain the wire lengths 23, 24 at the upper and lower ends of chamber 25 with the aid of suitable lines of adhesive 27, or by molding them into the mat materials.

The intermediate wire portions of the series of wires 20 extend in a diagonal manner across the mat 20 so that, as a whole, they extend throughout substantially the entire length of the mat. It is thus assured that certain of such intermediate wire portions at least will be in the path of a car wheel passing over the mat. The length of each intermediate wire portion should be less than the width of the tread of the smallest automobile tire that might pass over the mat. For example, as the tread width of a 5.20 x 13 tire which is used on small cars, is approximately 2 inches to 2½ inches, the length of the intermediate wire portions should be less than 2 inches in order to assure that at least one intermediate portion of the series of wires 20 will be fully overrun by a tire of the indicated size passing over the mat.

It will be understood from the foregoing, that when the tire of an automobile pulling up to a gasoline pump rolls over the mat 10, such tire will press the lengths 23 in those parts which it overruns of the intermediate portions in the series of wires 20 embedded in the mat, down upon the lengths 24 of such portions against the tendency of the resilient material 26 of such mat to hold such lengths in said parts separated. In so overrunning the intermediate wire portions, the tire will completely overrun at least one of such intermediate wire portions and tend to press the entire wire length 23 of the latter down against its associated wire length 24. Depending on the condition of the tread in such tire, the latter will condition the completely overrun intermediate wire portion to modify the circuit containing the signalling device 12. Thus, as is shown more clearly in FIGS. 5 and 6 of the drawings, if the tread of the tire is good, those portions of the mat which are engaged by the grooves or cavities 28 in the tread will not be compressed to the extent that the portions of the mat engaged by the wearing surface of the tread are compressed. If the grooves or cavities 28 are deep enough as in a good tread, those wire sections 23' of the wire lengths 23 which do not receive the full pressure of the tire because of such grooves or cavities will not come into sufficient contact with the associated wire sections 24' to enable current to flow through the intermediate wire portions formed by such lengths. Therefore, even though the tire completely overruns an intermediate wire portion, if the tread thereof is good, there will be gaps in the engagement of the lengths 23, 24 thereof and current cannot flow through such wire portion. Since the circuit to the signalling device 12 cannot be thus completed, such device will remain inactive. It will be observed that as the grooves or cavities in a tire tread are of the order of ⅛ inch, and that such groove or cavity must completely span at least one of the wire sections 23', the latter are substantially less in length than ⅛ inch.

On the other hand, when as is illustrated in FIGS. 7 and 8, a tire tread is worn to the extent that it has no grooves or cavities 28, or the latter are quite shallow, the wire sections in the length 23 which is completely overrun, will all be pressed into contact with the wire sections in the associated length 24, thus providing an unbroken path for current through the intermediate wire portion formed by such lengths. The circuit containing the signalling device 12 will thus be closed and such device will be rendered operative to give an appropriate signal to the attendant.

While I have hereinabove described and illustrated in FIGS. 1–8 of the drawings, in detail, one embodiment of the invention, it will be apparent to those skilled in the art that various changes and modifications thereof may be made without departing from the spirit of the invention or the scope of the appended claims. Thus, for example, the number of wires 20 may be considerably varied and may even be reduced to one or two of such wires so that the width of the mat can be substantially reduced and may be made in the form of a strip. Instead of wires 20 composed of lengths 23, 24 in certain portions thereof, such lengths may be replaced by the same or other conductive materials having different configurations. The wires 20 may also be replaced by the same or other conductive materials having different configurations. The wires 20 may also be replaced by one or more filaments or strips of a compressible resilient material such as rubber or plastic, and having embedded therein electrically conductive particles of any suitable material so that such strips are capable of affording improved electrical conductivity when compressed. Two such strips, placed in such a way that portions of both are simultaneously placed under pressure by the tires of an overpassing vehicle, can be utilized to detect readily the conditions of tires on all sizes of passenger vehicles and trucks, and to emit different signals for the attention of the attendant. Generally speaking, this may be accomplished by having one conductive strip constructed and arranged so that the portion thereof subjected to pressure by a vehicle wheel is variably compressed in accordance with the condition of the tire tread on such wheel, and the other strip arranged in such underlying relation to the first strip that the load of the vehicle wheel is equally distributed throughout the pressed portion thereof. A signal device so constructed in accordance with the invention, is illustrated in FIGS. 9–12 of the drawings.

The embodiment shown in FIGS. 9–12 of the drawings is made in an elongated strip instead of a mat as will be apparent from FIG. 9 which shows a portion of a tire 29 crossing such strip, and may even be made in cable form in the manner of the signal devices now employed at gas stations to notify the attendant of entering cars. The device is composed of two strips 30, 31 which preferably extend the length of the device and each of which is composed of a suitable compressible, resilient material having embedded therein particles 32 of any suitable electrically conductive material. The strips 30, 31 are contained in a top longitudinally extending groove 33 provided in the body 34 of the device. The body 34 of the device is made of a suitable, non-conductive compressible material such as rubber or a suitable plastic material and may have any suitable cross-sectional configuration, such as the segmental shape shown in FIG. 9 of the drawings. The cross-sectional configuration of the device shown in FIG. 9 is preferable when the compressible material of the strips 30, 31 is a nonconductive material. When the compressive material of such strips 30, 31 is made of a conductive material, it is preferred that the strips 30, 31 be enclosed by the non-conductive material of the body 34 thereof, in which case the body 34 may have a circular or oval cross-sectional form. Embedded in the body 34 and extending lengthwise of the device along the sides of the strips 30, 31 are two wires 35, 36 of electrically conductive material, such as copper. At one end of the device the wire 35 is electrically connected to the adjacent end of the strip 30 by a conducting wire 37, and the wire 36 is electrically connected to the adjacent end of the strip 31 by a conducting wire 38 (note FIG. 9).

The conductive, compressible, resilient material of the two strips 30, 31 may be constituted of a natural rubber or a synthetic plastic material having the desired compressible and resilient characteristics. Preferably, the resilient material is a relatively soft material that is able to return to its original configuration after being subjected to pressure. As above indicated, such material may or may not per se be electrically conductible, but it is preferred that it be non-conductive. The particles 32 embedded in the resilient material of the strips 30, 31 may be of any desired shape, but should have a maximum dimension substantially less than the width of the tread of the smallest automobile tire that might pass over the mat. The particles 32 should be in sufficient quantity in the resilient material so that the strips 30 and 31 are capable of conducting electricity, even through such resilient material is non-conductive. A material that is excellently suitable for the purposes of the invention is a known compound of natural rubber and a carbon black known as Vulcan Black XC72 and composed of carbon particles which are approximately 29 microns in size and have a resistivity of 10 ohms per 30 cubic centimeters. This conductive compound is relatively soft, having a durometer reading of about 40, and is quite conductive. Under pressure this conductive compound will increase its ability to transmit electrical current and is capable of making a substantially 100% recovery to its original configuration when such pressure is withdrawn.

Preferably, in accordance with the invention, there is located between the two strips 30 and 31 a layer 40 of more rigid material than the materials of such strips to prevent substantial distortion of the strip 31 even though the strip 30 is substantially distorted by a tire tread and thereby to cause a substantially uniform pressure to be applied over the portion of strip 31 compressed by a vehicle tire. Strip 31 thereof is in effect a reference strip which will cause a flow of current dependent on the size of the tire and the weight of the vehicle applied therethrough and regardless of whether such tire has a good or bad tread. In other words, as a result of the layer 40, the strip 31 will transmit even for tires that have a good tread, a current flow comparable to that which would be transmitted if the tire has little or no tread. The material of the layer 40 is substantially more rigid than the material of the layers 30, 31 in order to obtain the desired results and may be constituted of any suitable metallic or non-metallic material such as sheet metal, hard plastic, vulcanized rubber, pressed fibers, etc. Such material is preferably an electrically nonconductive material, but may be made of a conductive material that does not effect the electrical functions of the layers 30, 31.

Figure 10:
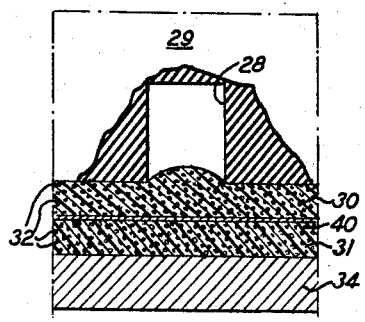
Figure 11:
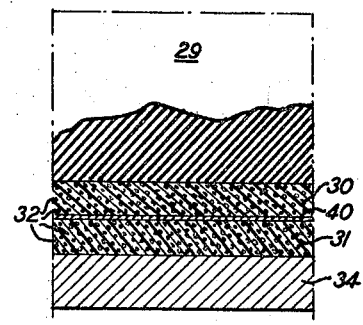

The manner in which the several layers function is illustrated in FIGS. 10 and 11 of the drawings. When a tire having a good tread such as shown in FIG. 5 of the drawings, crosses the device, transverse portions of the relatively soft material of strip 30 will enter into the grooves or cavities 28 of the tire tread and be under less pressure than those adjacent portions of the strip which are engaged by the wearing surface portions of the tread. As a result, the lesser compressed transverse portions of the stop 30 within the tread grooves 28 will prevent an increase in the transmission of current flow through the length of the strip to the extent that such flow would have increased if the tread had been worn. However, because of the layer 40, the full weight of the vehicle applied through the tire will be applied substantially uniformly to the underlying transverse portion of strip 40 as though through a worn tread. FIG. 11 shows the configurations assumed by the strips 30 and 31 when the tread of the tire is worn, the transverse strip portions under pressure in such event, being both substantially uniform and under the same pressure throughout so that they both will permit transmission of the same current flow.

Figure 12:
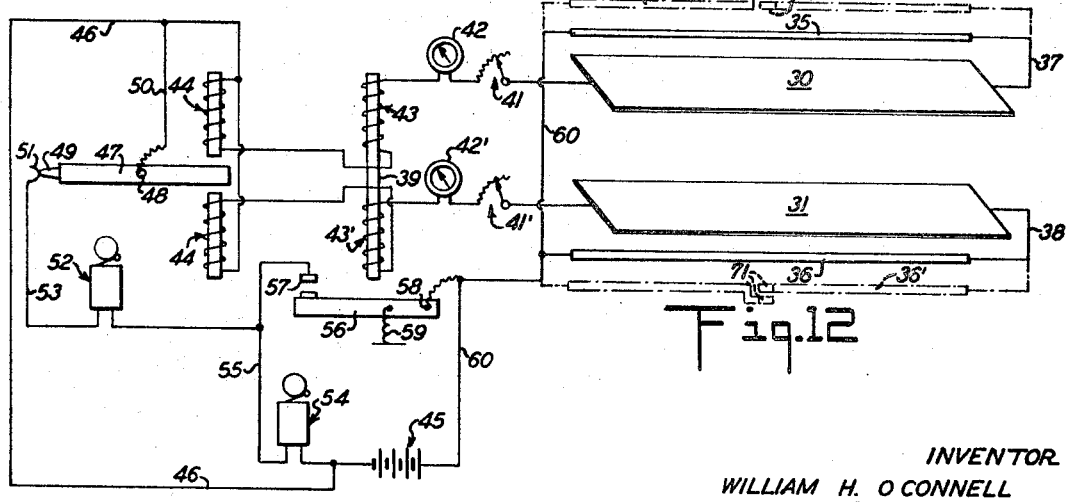
FIG. 12 is an example of a circuit that may be used in connection with the modified form shown in FIGS. 9–11.

As is shown in FIG. 12 of the drawings, each of the strips 30, 31 are connected in series to variable resistances 41, 41', respectively, which are adjusted to cause the flow of current through the two strips to be balanced or equal, when no pressure is exerted on such strips. This flow adjustment may be checked by the ammeters 42, 42' associated with the strips 30, 31', respectively. The strip 30 is also connected in series to the coils of two electromagnets 43, 44, and strip 31 is connected in series to the coils of two electromagnets 43' and 44'. The electromagnets 43, 43' are aligned and have a common fixed core 39. The separate cores of electromagnets 44, 44' are aligned in fixed spaced relation and are electrically connected together and to a source of current 45 through a connector wire 46. Located between the opposed spaced ends of the electromagnets 44, 44' is one end of a switch member 47 pivotally supported intermediate its ends for movement about the pivot 48 and provided at its other end with a contact 49. The switch member is electrically connected by a wire 50 to the wire 46 between the electromagnets 44, 44' and the current source 45. The contact 49 engages with a contact 51 connected to a signal device 52 by a conductor wire 53 and to a signal device 54 by the conductor wire 55. The two signal devices are connected to the current source 45 and to a contact 57 of a switch whose arm 56 extends in spaced relation across the bottom end of the common core 39 of electromagnets 43, 43'. The switch arm 56 is mounted for movement about the pivot 58 and is biased away from the electromagnet core 39 by a spring 59 connected to a fixed support. The switch arm 56 is electrically connected to the copper wires 35 and 36 and to the current source 45 by a conductor wire 60.

From the foregoing, it will be understood that when there is no tire pressure on the strips 30, 31 of the device, equal currents will be flowing through such strips, and the circuit of the device will be in the condition shown in FIG. 12. In such condition, the electromagnets 43, 43' through their common core 39 will exert a magnetic pull on switch arm 56, but this pull is not sufficient to overcome the force of spring 59 so that the contacts 57 of such switch remain open and no current will flow to the signal devices 52, 54. Assuming now that a tire 29 with a good tread as indicated in FIG. 10 passes over the device. The pressure of such tire on the strips 30, 31 will cause an increase in the current flow through the coils of electromagnets 44, 44', thereby causing an increase of the magnetic pull on switch arm 56 to move the latter against the tension of spring 59 to close the contacts 57 and thus cause the signal device 54 to be actuated. However, since the current flow through strip 30 will be less than that caused to flow through the strip 31 because of the good tread on such tire, the magnetic force exerted by electromagnet 44 on the switch member 47 will be less than the magnetic force exerted on such switch member by the electromagnet 44'. This will cause the associated end of the switch member 47 to move downwardly toward the electromagnet 44', thereby opening the contacts 49, 51 and preventing operation of the signalling device 52.

When, however, a tire with a worn tread passes over the strips 30 and 31, this causes actuation of the signal device 54 in the manner above described, and in addition causes the operation of the signal device 52 because the magnetic forces exerted by the electromagnetics 44, 44' on the switch member 47 will be balanced due to the fact that the pressure on the compressed transverse portions of the strips 30 and 31 will be equally distributed by the worn tire as indicated in FIG. 11 of the drawings. Consequently, the switch member 47 will remain in the position shown in FIG. 12 with the contacts 49, 51 closed, so that the closing of switch 56 will cause current to flow to both signalling devices 52 and 54. It will thus be seen, that the signal device 54 will always operate when a tire, regardless of its condition, passes over the strips 30, 31 and therefor performs the functions of announcing to the attendant the approach of a customer car and alerting him to listen or look for the second signal device 52 which by its operation, or failure to operate, will inform him of the condition of the tire or tires that passed over the strips 30 and 31.

It will be apparent to those skilled in the art that other circuitry than those particularly disclosed herein may be suitable for carrying out the invention. For example, it may be considered advantageous to use circuits of the class known as bridge circuits, one of which is the well known Wheatstone bridge circuit, and in which a known impedance is compared with an unknown impedance. Circuits of this type may be preferable for use in those forms of apparatus embodying the invention wherein the ground device is composed of only one layer or strip similar to the above described layers 30 and 31 and without the separating layer 40. It will also be apparent to those skilled in the art that a circuit of the type shown in FIG. 12 of the drawings may be modified for use with such a single layer or strip. When the ground strip embodies but a single strip and therefore does not have the advantage of a reference strip, such as the second strip 31 in the embodiment of FIGS. 9–12, it may be desirable that the variable balancing resistor, such as the resistors 41, 41' in FIG. 12, be calibrated in terms of the size and weight of vehicles, thereby making the apparatus adaptable for use with all classes of cars such as midgets, compacts, middle sized and large sized cars. The resistor may have a legend attached to it indicating where the pointer should be placed for a particular type of car so that the attendant can readily adjust the resistor to the proper condition.

The circuit of FIG. 12 may also be modified to include a plurality of strips similar to the above described strip composed of the layers 30 and 31 arranged in spaced parallel relation in the manner of the wires 20 shown in FIG. 2 of the drawings, and such plurality of strips may have a length substantially shorter than the length of the ground member and arranged in the latter in the same offset manner as the wire length portions 23, 24 shown in such FIG. 2. In this latter construction it may also be found advisable to render each of such short strips electrically inoperative so long as a vehicle tire is not passing over the same, and to render electrically operative only that particular strip over which the automobile tire passes. The manner in which this may be accomplished is indicated in FIG. 12 of the drawings wherein the conductor wires 35, 36 are replaced as is shown in dotted lines, by two conductor wires 35', 36' which are broken intermediate the length of the strips 30, 31 and provided with cooperating contacts 70, 70 and 71, 71, respectively, which will be closed whenever a tire passes over that particular strip; it being understood that the associated contacts 70, 70 and 71, 71 of the other longitudinally displaced strips will remain open since they will not be crossed by the tire. The contacts 70, 70 and 71, 71 may be advantageously constructed and positioned relative to the layers 30, 31 of the strip so that their closure is assured when a vehicle tire passes over such strip. It will also be understood that where in the claims I refer to the second conductors, that such term includes the layers 30 and 31 in each of said strips, and the wire length portions 23, 24 in the embodiment of FIG. 2 of the drawings.

It will also be apparent to those skilled in the art, that instead of superimposing the two strips 30 and 31 one upon the other, such strips may be spaced so that a tire will cross first one strip and then the other. In such construction it may be advantageous to enclose one strip, for example the strip 31 in a rigid casing instead of separating it from strip 30 by a rigid layer 40. Further, it will be apparent to those skilled in the art that the circuit modification effects in the apparatus under the tire pressure may be compared in sequence instead of simultaneously. Accordingly, it is my purpose to cover all embodiments of the invention coming within the scope of the appended claims.

I claim:

1. Signalling apparatus capable of differentiating between good and bad tire treads comprising a ground device adapted to be located in the path of travel of a tire on an automobile, a signalling device, and an electrical circuit connecting said ground device and said signalling device, said circuit comprising a first electrical conductor constituted of a wire electrically connected at one end to said signalling device, and a second electrical conductor contained in said ground device so as to extend across such path of travel of an automobile tire and electrically connected to said signalling device and to the other end of said first conductor, said second conductor being composed of a plurality of portions of conductive material embedded in readily compressible, resilient material and said portions having a maximum dimension less than the width of the tread cavities in an automobile tire, said portions of conductive material being constructed and arranged in said resilient material to tend to modify the electrical circuit to operate said signalling device when an automobile tire having a worn tread passes transversely over said second conductor in said ground device, and said material in which said portions of conductive material are embedded having such compressibility and resiliency that when a good tire passes transversely over said second conductor those of said portions of conductive material underlying the tread cavities in the good tire will not have sufficient pressure exerted thereon to effect said modification of the electrical circuit to operate said signalling device.

2. Signalling apparatus as defined in claim 1, in which said portions of conductive material in said second conductor are disposed in two parallelly arranged superimposed lines and said lines thereof are constructed and arranged to cooperate to modify the electrical circuit to operate said signalling device when such lines are pressed together by a tire having a worn tread.

3. Signalling apparatus as defined in claim 2, in which the lower one of said two lines of conductive material portions comprises a plurality of substantial stationary spaced circuit elements each extending across the path of travel of the tire a distance less than the width of a tread in an automobile tire, and the upper one of said two lines comprises a plurality of spaced circuit elements each extending across the path of travel of the tire a distance less than the width of a tread in an automobile tire, and movable toward said stationary circuit elements under the weight of a worn tire to complete a circuit for said signalling device.

4. Signalling apparatus as defined in claim 1, in which said portions of conductive material consist of particles distributed throughout the resilient material in such quantity as to provide said second conductor with a normal given conductive quality and rendering said second conductor capable of increasing its conductiveness under pressure.

5. Signalling apparatus as defined in claim 4, in which said resilient material is electrically non-conductive and in which said portions of conductive material are constituted of carbon black.

6. Signalling apparatus as defined in claim 1, in which said circuit includes a plurality of second conductors each composed of a plurality of portions of conductive material portions embedded in resilient material and arranged in spaced parallel relation in said ground device.

7. Signalling apparatus as defined in claim 6, in which said second conductors are arranged in superimposed relation, and a layer separating said superimposed second conductors and consituted of a material more rigid than the resilient material in which the conductive material portions of said second conductors are embedded.

8. Signalling apparatus as defined in claim 7, in which said circuit includes means for balancing the current passing through one of said second conductors with the current passing through the other of said second condctors, and so constructed and arranged that when the electrical circuit is modified by an automobile tire passing over said second conductors, such balancing means permits the operation of said signalling device when the currents flowing through said second conductors are substantially equal, and prevents the operation of said signalling device when the currents flowing through said second conductors are unequal.

9. Signalling apparatus as defined in claim 1, in which said circuit includes a second signalling device, switch means controlling the operation of said second signalling device, means maintaining said switch means inoperative in the unmodified condition of the electrical circuit, and means operative in the modified condition of the electrical circuit to actuate said switch means to operate said second signalling device.

10. Signalling apparatus as defined in claim 1, in which the body of said ground member is constituted of flexible non-conductive material, and in which said first and second electrical conductors are mounted in such body and are electrically insulated by the latter from the ground.

11. Signalling apparatus as defined in claim 1, in which said circuit includes a plurality of second conductors longitudinally displaced in said ground device so that said second conductors as a whole extend over the length of said ground device.

12. Signalling apparatus as defined in claim 11, in which each of said second conductors are constructed and arranged so as to be normally electrically inoperative to effect said modification of the electrical circuit, and become separately electrically operative to effect said modification depending on the portion of the ground device crossed by the automobile tire.

No references cited.

JOHN W. CALDWELL, *Primary Examiner.*

ALVIN H. WARING, *Examiner.*